United States Patent [19]

Oda

[11] 3,735,152

[45] May 22, 1973

[54] DC REGENERATING SYSTEMS HAVING CURRENT SOURCE EXHIBITING POSITIVE RESISTANCE AND HAVING ZERO CROSSING V-I CHARACTERISTIC AT A REFERENCE POTENTIAL

[75] Inventor: Minoru Oda, Minami-Shimizu, Amagasaki-shi, Japan

[73] Assignee: Mitsubishi Denki Kabushiki Kaisha, Tokyo, Japan

[22] Filed: May 10, 1971

[21] Appl. No.: 141,796

[30] Foreign Application Priority Data

May 19, 1970 Japan ..............................45/42626

[52] U.S. Cl. ..................307/237, 307/268, 307/313, 328/162, 328/164, 330/30 D

[51] Int. Cl. ................................................H03k 5/08

[58] Field of Search...................178/7.3 DC, 7.5 DC; 328/162, 164; 330/11, 30 D, 149; 307/268, 290, 292, 237, 313

[56] References Cited

UNITED STATES PATENTS

| | | | |
|---|---|---|---|
| 3,551,596 | 12/1970 | Borenstein | 178/7.3 DC |
| 3,010,031 | 11/1961 | Baker | 307/292 X |
| 3,378,780 | 4/1968 | Lin | 330/30 D |
| 3,435,362 | 3/1969 | Pamlenyi | 330/30 D |
| 3,164,727 | 1/1965 | Heyda | 307/290 X |
| 3,290,573 | 12/1966 | Kamens | 307/292 X |
| 3,304,508 | 2/1967 | Danielsen et al. | 328/164 |
| 3,324,306 | 6/1967 | Lockwood | 307/292 |
| 3,564,300 | 2/1971 | Henle | 307/292 X |

*Primary Examiner*—Stanley D. Miller, Jr.
*Attorney*—Flynn & Frishauf

[57] ABSTRACT

A DC regenerating system, comprising a differential amplifier including first and second transistors with their emitter electrodes connected to a common power source of a first polarity, preferably through a resistor, a pair of semiconductor elements, a source of opposite polarity potential connected in common to one electrode of the semiconductor elements preferably through a resistor, means to connect another electrode of one of the semiconductor elements to the juncture between the base electrode of the first transistor and the collector electrode of the second transistor, an input terminal, a capacitor connected between the input terminal and said juncture and an output terminal connected said juncture. The DC regenerating system functions to supply a large current in a limited potential region with respect to a reference potential (usually zero), but decreases its current outside the potential region. The system has a positive resistance at a reference point of the potential and supplies a zero current only at the reference point of the potential.

13 Claims, 9 Drawing Figures

FIG.3 PRIOR ART
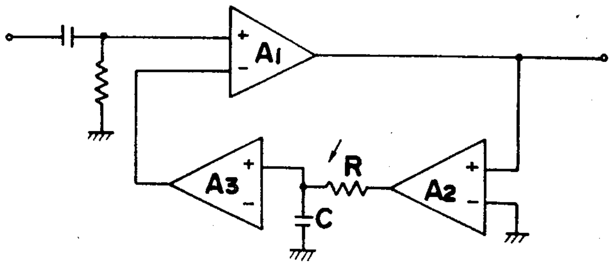
FIG.4
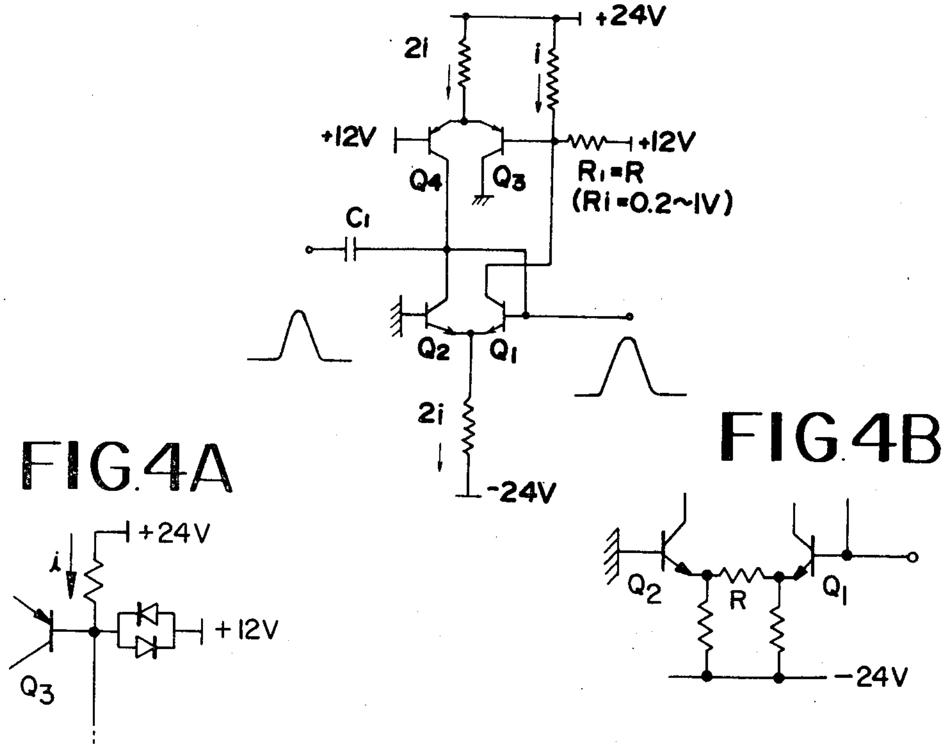
FIG.4A FIG.4B

DC REGENERATING SYSTEMS HAVING CURRENT SOURCE EXHIBITING POSITIVE RESISTANCE AND HAVING ZERO CROSSING V-I CHARACTERISTIC AT A REFERENCE POTENTIAL

BACKGROUND OF THE INVENTION

This invention relates to a DC regenerating circuit, and more particularly to a high accuracy DC regenerating circuit suitable for a pulse height analysis capable of eliminating base line shift caused by an AC coupling when analyzing the pulse height in the measurement of radiations, for example.

One prior art method of eliminating the base line shift will be considered hereunder with reference to FIG. 1 of the accompanying drawing. When a pulse 4 is impressed upon an input terminal 3 of an AC coupling element comprising a capacitor 1 and a resistor 2, an output wave with a the base line shift (B.S) appears at an output terminal 5. The time constant RC of the element which is determined by the values of capacitor 1 and resistor 2 is selected to be sufficiently larger than the period $T_1$ between incomming pulses. The base line shift B.S is nearly equal to the product of the height of the pulse PH and the duty ratio $T_2/T_1$. Inasmuch as the period $T_1$ of the incoming pulses varies irregularly in the radiation measurement, the value of the base line shift B.S varies with the result that not only the effective pulse height decreases but also, the resolution of the value of the height is lowered.

For this reason, in the DC regenerating system it is necessary to prevent the above described decrease and variation in the effective pulse height value. It is also desirable that the incorporation of the DC regeneration circuit does not affect the filtering characteristic of the entire measuring system for the signal and noise as well as the mode of measuring the pulse height. Conventional measuring systems for pulse height analysis are generally designed to manifest the most suitable filtering characteristic for a maximum signal to noise ratio so that it is not desirable to vary the filtering characteristic by the addition of the DC regenerating system.

Such variation means the variation in the logical modes of the information of the measuring system which is of course undesirable because it requires modification of the mode of the most suitable filtering action.

The importance of providing an excellent DC regenerating system is becoming more acute with the improvement of the accuracy of measurement. Although a number of DC regenerating systems have been developed recently, there is no ideal system for the reason described above.

FIG. 2 and 3 illustrate typical prior art DC regenerating systems. FIG. 2 shows a DC regenerating system proposed by C. W. Williams in which a diode is incorporated into a negative feedback circuit to provide a steep rectifying characteristic, thus restoring the base line. More particularly, during an interval in which a negative input pulse appears, the anode potential of a diode $D_1$ is varried to substantially follow the input pulse and this pulse potential appears at an output terminal through a transistor $Q_1$. During this period, input coupling capacitor $C_1$ or $C_2$ is slightly (with reference to the height of the input pulse) charged by the current through transistor $Q_4$ but the capacitor is quickly discharged through transistors $Q_1$ to $Q_3$ and diode $D_1$ immediately after termination of the input pulse, thus returning to the normal state.

As a consequence, with the system shown in FIG. 2, although it is possible to sufficiently reduce the restoring time of the base line, the reference potential of the measurement of the pulse height is not equal to the mean value of the base line but instead takes the form of an envelope on the positive side of the noise wave. This results in an increase in the equivalent noise amplitude causing a decrease in the resolution by an amount of 10 to several tens percent regardless of the rate of counting. As a result, in order to suppress such an increase in the noise amplitude it is inevitable to sacrifice the restoring ability of the base line thus requiring a compromise between two opposing functions dependent upon the rate of counting the input. For this reason, input coupling capacitors $C_1$ and $C_2$ are connected to be switched from one to the other in accordance with the rate of counting. With this sysem however, in spite of the abovementioned compromise, it is still impossible to perfectly prevent the lowering of the resolution.

FIG. 3 shows a DC regenerating system proposed by R. Patzelt in which the input signal is linearly amplified by a pulse amplifier $A_1$ to be supplied to an output terminal, and a limiting amplifier $A_2$ generates a limited output voltage in response to a positive or negative output voltage A1 which is smoothed out by a low pass filter comprising a resistor R and a capacitor C. The output of the low pass filter is fed back to the point of reference potential of the pulse amplifier A1 through a buffer amplifier $A_3$. In this manner, the high frequency input signal is conveyed to the output terminal without any appreciable distortion and the base line is set at a potential at which the wave involving the signal and the noise resides for the same interval on the positive and negative sides, thus substantially equalizing the mean movement of the base line to the product of the duty ratio of the signal and the P—P value of the noise.

Without the DC regenerating system, since the base line shift is equal to the product of the duty ratio of the signal and the pulse height it can be considered that this system functions to decrease the quantity of the base line shift by the order of the signal to noise ratio of the signal being processed. Thus, although this system can not perfectly eliminate the problem of the base line shift, as it can pass the high frequency signal without any appreciable distortion it is advantageous in that it can prevent any substantial increase in the noise as in the system shown in FIG. 2.

Accordingly, it can be said that the lowering of the resolution at a low rate of counting can be substantially eliminated. However, at a high rate of counting, since said base line shift and the variation in the base line to be described hereinafter still remain, complete elimination of the lowering of the resolution is not yet perfect. More particularly, the voltage appearing at the output terminal of the limiting amplifier $A_2$ during an interval in which the input signal is present acts to charge the capacitor C in the low pass filter but owing to this charging, the base line potential immediately after termination of the input signal has been changed and then the base line potential gradually restores its original value through the negative feedback loop. If the charging voltage due to a single input pulse were larger than the noise level the base line would recover linearly, but approximately exponentially in a region below the noise level. The accummulated residual voltage provides the residual component of the base line shift. However, in the measurement of radiations and the like, as the interval of the incoming pulses is irregular, residual of the base line shift also causes the residual in the variation of the base line shift, thus resulting in the lowering of the resolution.

Where the base line varies exponentially, the recovery time constant $\tau$ is given by $$\tau \approx (RC\ Vn)/(A_1\ A_3\ V_2) \qquad 1$$

where Vn represents the P–P value of the noise voltage and $V_2$ the output voltage of the limiting amplifier $A_2$. When the charging voltage generated at capacitor C of the low pass filter at each input pulse is made small the recovery time constant becomes larger. The purpose of decreasing the variation in the base line caused by the superposition of the residual wave generated by the charging can better be accomplished by decreasing the charging voltage rather than by decreasing the recovery time constant as can be evidenced by the Cambell's theorem. This approach, however, decreases the ability of reducing low frequency noise thus rendering impossible to operate stably in the presence of an excessive noise in the low frequency range. This also requires a compromise.

As above described, although the Patzelt system shown in FIG. 3 has better ability than that of the Williams system shown in FIG. 2 at the time of low rate counting, as the reference potential of the base line is determined by the percentage of the residence time on the positive and negative sides of the wave containing the noise, at a high rate of counting a base line shift comparable with the amplitude of the noise will remain so that it is impossible to perfectly eliminate the variation of such a residual. Further, there is a problem of the loss of the stable point of the base line when the duty ratio of the signal exceeds ½.

To eliminate these problems Patzelt has proposed to incorporate a discriminator and a gate circuit into the system shown in FIG. 3 for interrupting the output from the limiting amplifier during the period in which the signal is present. Theoretically, this approach is substantially ideal but rather complicates the construction thus lacking utility. There is no report on the reduction to practice.

SUMMARY OF THE INVENTION

It is therefore an object of this invention to provide a new and improved DC regenerating system which can eliminate various defects of the prior art systems.

A more specific object of this invention is to provide an improved DC regenerating circuit which is simple in construction, provides high resolution and has a high response speed and large signal to noise ratio.

According to this invention there is provided an improved DC regenerating circuit comprising a differential amplifier including first and second transistors with their emitter electrodes connected together to a common negative source through a resistor, a pair of semiconductor elements, a source of positive potential connected through a resistor to one electrode of the semiconductor elements, means to connect another electrode of one of the semiconductor elements to the juncture between the base electrode of the first transistor and the collector electrode of the second transistor, an input terminal, a capacitor connected between the input terminal and said juncture, and an output terminal connected to said juncture. The DC regenerating system supplies a large current in a limited potention (usually zero) region with respect to a reference potential but decreases its current outside the potential region. The system has a positive resistance at a reference point of the potential and supplies a zero current only at the reference point of the potential.

BRIEF DESCRIPTION OF THE DRAWINGS

FIG. 2 and 3 are connection diagrams illustrating two types of prior art DC regenerating systems described above;

FIG. 4 shows a conection diagram of one embodiment of the novel DC regenerating system embodying the invention;

FIGS. 4A and 4B show modifications to the circuit of FIG. 4;

DESCRIPTION OF THE PREFERRED EMBODIMENTS

A preferred embodiment of this invention shown in FIG. 4 comprises a first differential amplifier including transistors $Q_1$ and $Q_2$, and a second differential amplifier including transistors $Q_3$ and $Q_4$. The collector electrode of transistor $Q_2$ forms a positive feedback circuit whereas the collector electrode of transistor $Q_4$ a negative feedback circuit. A resistor $R_1$ is connected between a positive terminal of +12 volts and the base electrode of transistor $Q_3$ for limiting the amplitude of the base potential of transistor $Q_3$ to prevent a delay of the response caused by charging a stray capacitance. The value of this resistor is selected to make the gain of the negative feedback loop larger than that of the positive feedback loop. Usually, it is advantageous to select the value R of resistor $R_1$ such that the product of R and the current $i$ which flows through a resistor connected between the base electrode of transistor $Q_3$ and a terminal of +24 volts equals about 0.2 to 1 volt. It is to be understood that this resistor $R_1$ may be replaced by a pair of diodes connected in parallel opposition (see FIG. 4A). A capacitor $C_1$ is connected between an input terminal and transistors $Q_1$, $Q_2$ and $Q_4$ for transmitting thereto a high frequency signal. The value of capacitor $C_1$ is made sufficiently large to prevent the distortion of the pulse waveform caused by the charging current supplied from the feedback circuits.

Figure 5:
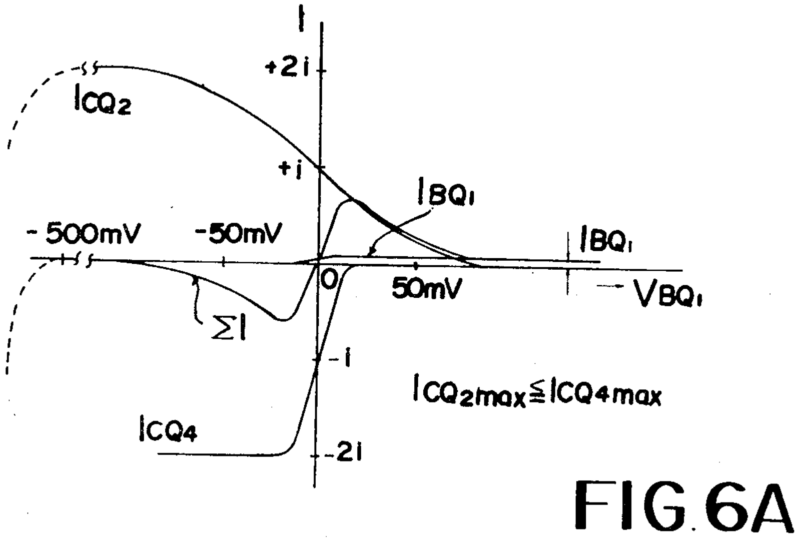
FIG. 5 is a plot showing the current voltage operating characteristics of the system shown in FIG. 4.

FIG. 5 shows current-voltage characteristics between the base electrode of transistor $Q_1$ and the reference voltage for respective current paths. Curve $\Sigma I$ represents a base line correction current corresponding to the sum of currents $I_{CQ2}$, $I_{CQ4}$ and $I_{BQ1}$. Curve $I_{CQ2}$ represents the collector current of transistor $Q_2$ comprising the positive feedback circuit, which manifests a negative resistance at the reference potential and has a maximum value of $2i$. Curve $I_{CQ4}$ represents the collector current of transistor $Q_4$ comprising the negative feedback circuit, which manifests a positive resistance at the reference potential which is maintained at a value smaller than the negative resistance of curve $I_{CQ2}$ by the gain of the second differential amplifier comprising transistors $Q_3$ and $Q_4$. The maxium value of $I_{CQ4}$ is also $2i$ as in the case of $I_{CQ2}$. As a consequence the sum of $I_{CQ2}$ and $I_{CQ4}$ takes a configuration of a letter S and has a stable point at the reference potential. In addition to these two currents, the base current also flows to the base electrode of transistor $Q_1$ but the base current is smaller than said two by about two orders of magnitude. Accordingly, in a region wherein the base potential of transistor $Q_1$ is largely remote from the zero potential, current $\Sigma I$ is nearly zero.

Further, in order to prevent the result and current characteristic will have more than two stable points, the maximum value of $I_{CQ2}$ is selected to be equal to or slightly smaller that the maximum value of $I_{CQ4}$. Where the base potential of transistor $Q_1$ reaches a negative value of several hundreds of millivolts the first differential amplifier comprising transistors $Q_1$ and $Q_2$ deviates from its range of normal operation so that the voltage range in which the current-voltage characteristic described above is effective lies between a lower limit of about −0.5V and an upper limit which is the breakdown voltage between the base and emitter electrodes of transistor $Q_2$. For this reason, where a negative pulse is to be processed opposite type transistors are to be used.

Considering the base line correction operation afforded by the current-voltage characteristics described above, in the absence of any signal at the input terminal, the output terminal potential will be maintained at the reference potential by the base line correction current shown by curve $\Sigma I$. Where only a small noise voltage (less than 100 mV P-P) is impressed upon the input terminal, the base line correction current will flow dependent upon whether the instantaneous value of the output terminal potential is positive or negative to charge capacitor $C_1$, thus maintaining the output terminal potential equal to the reference potential. Further, as the charging voltage appearing during the mean period of the noise wave is sufficiently small, the noise wave will not be distorted to any appreciable extent between the output and input terminals and only the low frequency component of the noise will be removed. In this case, the cut off frequency in the low frequency band is selected to be about 1 KHz, for example, which is sufficiently lower than the mean frequency of the noise. Where both a noise and a signal of 1V, for example, are impressed upon the input terminal, in the absence of the signals, the system operates in the same manner as above described whereas when a signal pulse is impressed upon the input terminal the output terminal potential greatly deviates (several tens millivolts) from the reference potential, and the base line correction current will disappear as shown in FIG. 5, thus preventing unwanted charging of capacitor $C_1$ without utilizing a gate circuit. For this reason, even when the signal and noise coexist, the output voltage is so controlled that the percentage residence times on the positive and negative sides of the noise wave alone excepting the signal are made equal, thus completely eliminating the base line shift as well as its variation.

Figure 1:
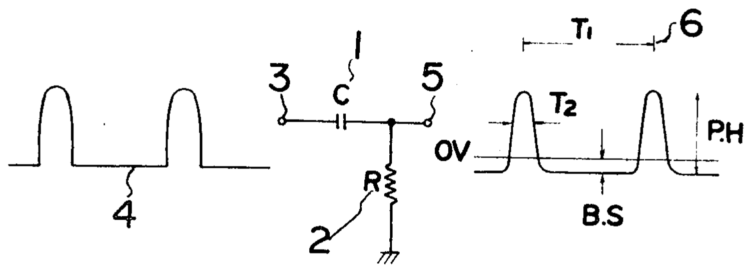
FIG. 1 is a diagram to explain the phenomenon of base line shift.
Figure 2:
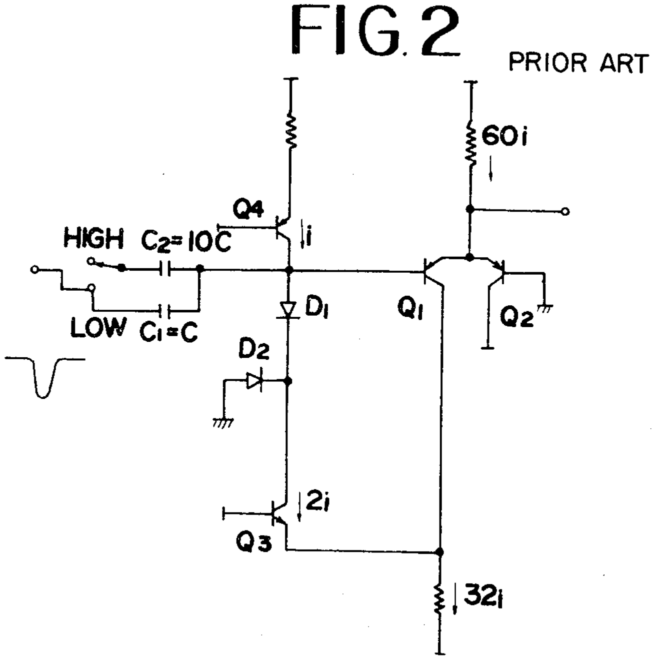
FIG. 2 PRIOR ART

Comparing the operation of the present novel system with those of the prior art systems shown in FIGS. 2 and 3, the present novel system is identical to the Patzelt system shown in FIG. 3 in that it can transmit without any appreciable distortion a high frequency signal and corresponds to the system shown in FIG. 3 which has been incorporated with a discriminator and a gate circuit for preventing unwanted charging of the capacitor of a low pass filter during the signal period. Thus, the present novel DC regenerating system can provide better performance than prior art DC regenerating system with simpler construction.

Figure 6A:
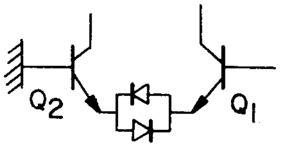
FIG. 6A shows a modification to the circuit of FIG. 6.
Figure 6:
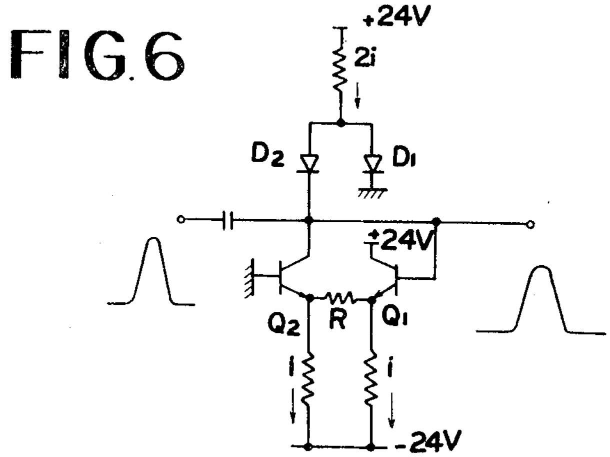
FIG. 6 shows a connection diagram of a modified embodiment of this invention.

A modified embodiment shown in FIG. 6 has a wider voltage range in which the base line correction current is effective than the embodiment shown in FIG. 4 and is suitable for use in a noise level of 100 mV P–P or higher.

The principle of operation of this embodiment is the same as that of the embodiment shown in FIG. 4. Thus, at the zero potential, the collector current of transistor $Q_2$ has a negative resistance and the current flowing through diode $D_2$ has a positive resistance. A resistor R is connected between the emitter electrodes of transistors $Q_1$ and $Q_2$ for the purpose of making the value of the negative resistance larger than the value of the positive resistance. Diodes (FIG. 6A) also may be used. Where the resistor R is not used, the value of the positive and negative resistances become equal and symmetrical with each other, thus failing to produce a correction current.

In the embodiment shown in FIG. 4 it is also possible to insert a resistor between the emitter electrodes of transistors $Q_1$ and $Q_2$ to enlarge the potential region in which the correction current is present.

Thus, it will be seen that the invention provides an improved DC regenerating system of simple construction and yet provides excellent DC regeneration. The novel regeneration system is applicable not only to the analysis of peak values but also to a discriminator in a high speed counting circuit for preventing a miscount due to the base line shift. High speed response of the regenerating system facilitates application thereof in this field. When compared with another system for preventing the base line shift, for example, a double delay line shaping circuit or other types of DC regenerating circuits, it is possible to maintain higher S/N ratios thus enabling to increase the margin of the discrimination level.

What is claimed is:

1. A DC regenerating system comprising:

a capacitor, one terminal of which receives input signals to said system;

a source of reference potential;

a source of current coupled to the other terminal of said capacitor, said current source including means coupled to said reference potential source for supplying a large current in a given limited potential region with respect to said reference potential, and for supplying a minimum current outside said potential region, said current source having a positive resistance at said reference potential, and having a V–I characteristic zero crossing only at said reference potential; and an output terminal coupled to the juncture of said source of current and said other terminal of said capacitor and serving as an output terminal of the DC regenerating system.

2. A DC regenerating circuit comprising:

a first differential amplifier including first and second transistors of a first conductivity type;

means for connecting the emitter electrodes of said first and second transistors to a common first power source of a first polarity;

a second differential amplifier including third and fourth transistors of an opposite conductivity type to said first conductivity type;

means connecting the emitter electrodes of said third and fourth transistors to a common second power source of an opposite polarity to said first polarity;

an input terminal;

means coupling the collector electrodes of said second and fourth transistors together, and for coupling the base electrode of said first transistor to the juncture between the collectors of said second and fourth transistors;

a capacitor coupled between said input terminal and said juncture between the collector electrodes of said second and fourth transistors and the base electrode of said first transistor; and an output terminal connected to said juncture for providing a DC regenerated output.

3. The DC regenerating circuit according to claim 2 wherein said power sources are voltage sources.

4. The DC regenerating circuit according to claim 2 wherein said first and second transistors are NPN transistors, said third and fourth transistors are PNP transistors, said first power source is a negative voltage source and said second power source is a positive voltage source.

5. The DC regenerating system according to claim 2 comprising a resistor coupling the collector electrode of said first transistor and the base electrode of said third transistor to another power source of the same polarity as said second power source, said another source having a lower output magnitude than said second source.

6. The DC regenerating circuit according to claim 2 comprising a pair of diodes connected in parallel opposition coupling the collector electrode of said first transistor and the base electrode of said third transistor to another power source of the same polarity as said second power source, said another source having a lower output magnitude than said second source.

7. The DC regenerating circuit according to claim 2 comprising a resistor connected between the emitter electrodes of said first and second transistors.

8. A DC regenerating system comprising:

first and second transistors of a first conductivity type;

means for connecting the emitter electrodes of said first and second transistors to a common first power source of a first polarity;

first and second diodes;

means for connecting first electrodes of both of said diodes to a common second power source of an opposite polarity to said first polarity;

means for coupling the other electrode of said first diode to a given potential;

an input terminal;

means coupling together the other electrode of said second diode, the collector electrode of said second transistor and the base electrode of said first transistor to thereby form a juncture;

a capacitor connected between said input terminal and said juncture; and an output terminal connected to said juncture for providing a DC regenerated output.

9. A DC regenerating system according to claim 8 wherein said power sources are voltage sources.

10. A DC regenerating system according to claim 8 wherein said first and second transistors are NPN transistors, said first power source is a negative voltage source, said second power source is a positive voltage source and said first electrodes of said diodes are their anode electrodes.

11. The DC regenerating circuit according to claim 8 comprising a resistor connected between the emitter electrodes of said first and second transistors.

12. The DC regenerating circuit according to claim 8 comprising a pair of diodes connected in parallel opposition connected between the emitter electrodes of said first and second transistors.

13. The DC regenerating system according to claim 8 wherein said given potential is ground potential.

* * * * *